United States Patent
Mittricker et al.

(10) Patent No.: US 9,599,021 B2
(45) Date of Patent: Mar. 21, 2017

(54) SYSTEMS AND METHODS FOR CONTROLLING STOICHIOMETRIC COMBUSTION IN LOW EMISSION TURBINE SYSTEMS

(75) Inventors: Franklin F. Mittricker, Jamul, CA (US); Richard A. Huntington, Houston, TX (US); Sulabh K. Dhanuka, Houston, TX (US); Omar Angus Sites, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 303 days.

(21) Appl. No.: 14/002,622

(22) PCT Filed: Mar. 5, 2012

(86) PCT No.: PCT/US2012/027772
§ 371 (c)(1),
(2), (4) Date: Aug. 30, 2013

(87) PCT Pub. No.: WO2012/128925
PCT Pub. Date: Sep. 27, 2012

(65) Prior Publication Data
US 2014/0000271 A1    Jan. 2, 2014

Related U.S. Application Data

(60) Provisional application No. 61/542,031, filed on Sep. 30, 2011, provisional application No. 61/466,385, filed on Mar. 22, 2011.

(51) Int. Cl.
*F02C 7/141* (2006.01)
*F02C 3/30* (2006.01)
*F02C 3/34* (2006.01)

(52) U.S. Cl.
CPC ............... *F02C 7/141* (2013.01); *F02C 3/30* (2013.01); *F02C 3/34* (2013.01); *Y02E 20/16* (2013.01)

(58) Field of Classification Search
CPC .... F02C 7/141; F02C 3/30; F02C 3/34; Y02E 20/16
(Continued)

(56) References Cited

U.S. PATENT DOCUMENTS 2,488,911 A    11/1949    Hepburn et al.
2,621,475 A *  12/1952    Loy ........................... F02C 3/34
                                                          60/39.17
(Continued)

FOREIGN PATENT DOCUMENTS

CA    2231749    9/1998
CA    2550675    7/2005
(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.
(Continued)

*Primary Examiner* — Steven Sutherland
(74) *Attorney, Agent, or Firm* — ExxonMobil Upstream Research Company Law Department (57) ABSTRACT

Systems, methods, and apparatus are provided for controlling the oxidant feed in low emission turbine systems to maintain stoichiometric or substantially stoichiometric combustion conditions. In one or more embodiments, such control is achieved by diverting a portion of the recirculating exhaust gas and combining it with the oxidant feed to maintain a constant oxygen level in the combined oxidant-exhaust stream fed to the combustion chamber.

25 Claims, 5 Drawing Sheets

(58) Field of Classification Search
USPC .................. 60/39.5, 39.52, 726, 728, 39.182
See application file for complete search history.

(56) References Cited

U.S. PATENT DOCUMENTS

| | | | |
|---|---|---|---|
| 2,884,758 A | 5/1959 | Oberle | |
| 3,561,895 A | 2/1971 | Michelson | |
| 3,631,672 A | 1/1972 | Gentile et al. | |
| 3,643,430 A | 2/1972 | Emory et al. | |
| 3,705,492 A | 12/1972 | Vickers | |
| 3,841,382 A | 10/1974 | Gravis, III et al. | |
| 3,949,548 A | 4/1976 | Lockwood, Jr. | |
| 4,018,046 A | 4/1977 | Hurley | |
| 4,043,395 A | 8/1977 | Every et al. | |
| 4,050,239 A | 9/1977 | Kappler et al. | |
| 4,066,214 A | 1/1978 | Johnson | |
| 4,077,206 A | 3/1978 | Ayyagari | |
| 4,085,578 A | 4/1978 | Kydd | |
| 4,092,095 A | 5/1978 | Straitz, III | |
| 4,101,294 A | 7/1978 | Kimura | |
| 4,112,676 A | 9/1978 | DeCorso | |
| 4,117,671 A | 10/1978 | Neal et al. | |
| 4,160,640 A | 7/1979 | Maev et al. | |
| 4,165,609 A | 8/1979 | Rudolph | |
| 4,171,349 A | 10/1979 | Cucuiat et al. | |
| 4,204,401 A | 5/1980 | Earnest | |
| 4,222,240 A | 9/1980 | Castellano | |
| 4,224,991 A | 9/1980 | Sowa et al. | |
| 4,236,378 A | 12/1980 | Vogt | |
| 4,253,301 A | 3/1981 | Vogt | |
| 4,271,664 A | 6/1981 | Earnest | |
| 4,344,486 A | 8/1982 | Parrish | |
| 4,345,426 A | 8/1982 | Egnell et al. | |
| 4,352,269 A | 10/1982 | Dineen | |
| 4,380,895 A | 4/1983 | Adkins | |
| 4,399,652 A | 8/1983 | Cole et al. | |
| 4,414,334 A | 11/1983 | Hitzman | |
| 4,434,613 A | 3/1984 | Stahl | |
| 4,435,153 A | 3/1984 | Hashimoto et al. | |
| 4,442,665 A | 4/1984 | Fick et al. | |
| 4,445,842 A | 5/1984 | Syska | |
| 4,479,484 A | 10/1984 | Davis | |
| 4,480,985 A | 11/1984 | Davis | |
| 4,488,865 A | 12/1984 | Davis | |
| 4,498,288 A | 2/1985 | Vogt | |
| 4,498,289 A | 2/1985 | Osgerby | |
| 4,528,811 A | 7/1985 | Stahl | |
| 4,543,784 A | 10/1985 | Kirker | |
| 4,548,034 A | 10/1985 | Maguire | |
| 4,561,245 A | 12/1985 | Ball | |
| 4,569,310 A | 2/1986 | Davis | |
| 4,577,462 A | 3/1986 | Robertson | |
| 4,602,614 A | 7/1986 | Percival et al. | |
| 4,606,721 A | 8/1986 | Livingston | |
| 4,613,299 A | 9/1986 | Backheim | |
| 4,637,792 A | 1/1987 | Davis | |
| 4,651,712 A | 3/1987 | Davis | |
| 4,653,278 A | 3/1987 | Vinson et al. | |
| 4,681,678 A | 7/1987 | Leaseburge et al. | |
| 4,684,465 A | 8/1987 | Leaseburge et al. | |
| 4,753,666 A | 6/1988 | Pastor et al. | |
| 4,762,543 A | 8/1988 | Pantermuehl et al. | |
| 4,817,387 A | 4/1989 | Lashbrook | |
| 4,858,428 A | 8/1989 | Paul | |
| 4,895,710 A | 1/1990 | Hartmann et al. | |
| 4,898,001 A | 2/1990 | Kuroda et al. | |
| 4,946,597 A | 8/1990 | Sury | |
| 4,976,100 A | 12/1990 | Lee | |
| 5,014,785 A | 5/1991 | Puri et al. | |
| 5,044,932 A | 9/1991 | Martin et al. | |
| 5,054,279 A * | 10/1991 | Hines .................... F01K 21/047 60/39.5 | |
| 5,073,105 A | 12/1991 | Martin et al. | |
| 5,084,438 A | 1/1992 | Matsubara et al. | |
| 5,085,274 A | 2/1992 | Puri et al. | |
| 5,098,282 A | 3/1992 | Schwartz et al. | |
| 5,123,248 A | 6/1992 | Monty et al. | |
| 5,135,387 A | 8/1992 | Martin et al. | |
| 5,141,049 A | 8/1992 | Larsen et al. | |
| 5,142,866 A | 9/1992 | Yanagihara et al. | |
| 5,147,111 A | 9/1992 | Montgomery | |
| 5,154,596 A | 10/1992 | Schwartz et al. | |
| 5,183,232 A | 2/1993 | Gale | |
| 5,195,884 A | 3/1993 | Schwartz et al. | |
| 5,197,289 A | 3/1993 | Glevicky et al. | |
| 5,238,395 A | 8/1993 | Schwartz et al. | |
| 5,255,506 A | 10/1993 | Wilkes et al. | |
| 5,265,410 A | 11/1993 | Hisatome | |
| 5,271,905 A | 12/1993 | Owen et al. | |
| 5,275,552 A | 1/1994 | Schwartz et al. | |
| 5,295,350 A | 3/1994 | Child et al. | |
| 5,304,362 A | 4/1994 | Madsen | |
| 5,325,660 A | 7/1994 | Taniguchi et al. | |
| 5,332,036 A | 7/1994 | Shirley et al. | |
| 5,344,307 A | 9/1994 | Schwartz et al. | |
| 5,345,756 A | 9/1994 | Jahnke et al. | |
| 5,355,668 A | 10/1994 | Weil et al. | |
| 5,359,847 A | 11/1994 | Pillsbury et al. | |
| 5,361,586 A | 11/1994 | McWhirter et al. | |
| 5,388,395 A | 2/1995 | Scharpf et al. | |
| 5,394,688 A | 3/1995 | Amos | |
| 5,402,847 A | 4/1995 | Wilson et al. | |
| 5,444,971 A | 8/1995 | Holenberger | |
| 5,457,951 A | 10/1995 | Johnson et al. | |
| 5,458,481 A | 10/1995 | Surbey et al. | |
| 5,468,270 A | 11/1995 | Borszynski | |
| 5,490,378 A | 2/1996 | Berger et al. | |
| 5,542,840 A | 8/1996 | Surbey et al. | |
| 5,566,756 A | 10/1996 | Chaback et al. | |
| 5,572,862 A | 11/1996 | Mowill | |
| 5,581,998 A | 12/1996 | Craig | |
| 5,584,182 A | 12/1996 | Althaus et al. | |
| 5,590,518 A | 1/1997 | Janes | |
| 5,628,182 A | 5/1997 | Mowill | |
| 5,634,329 A | 6/1997 | Andersson et al. | |
| 5,638,675 A | 6/1997 | Zysman et al. | |
| 5,640,840 A | 6/1997 | Briesch | |
| 5,657,631 A | 8/1997 | Androsov | |
| 5,680,764 A | 10/1997 | Viteri | |
| 5,685,158 A | 11/1997 | Lenahan et al. | |
| 5,709,077 A | 1/1998 | Beichel | |
| 5,713,206 A | 2/1998 | McWhirter et al. | |
| 5,715,673 A | 2/1998 | Beichel | |
| 5,724,805 A | 3/1998 | Golomb et al. | |
| 5,725,054 A | 3/1998 | Shayegi et al. | |
| 5,740,786 A | 4/1998 | Gartner | |
| 5,743,079 A | 4/1998 | Walsh et al. | |
| 5,765,363 A | 6/1998 | Mowill | |
| 5,771,867 A | 6/1998 | Amstutz et al. | |
| 5,771,868 A | 6/1998 | Khair | |
| 5,819,540 A | 10/1998 | Massarani | |
| 5,832,712 A | 11/1998 | Ronning et al. | |
| 5,836,164 A | 11/1998 | Tsukahara et al. | |
| 5,839,283 A | 11/1998 | Dobbeling | |
| 5,850,732 A | 12/1998 | Willis et al. | |
| 5,894,720 A | 4/1999 | Willis et al. | |
| 5,901,547 A | 5/1999 | Smith et al. | |
| 5,924,275 A | 7/1999 | Cohen et al. | |
| 5,930,990 A | 8/1999 | Zachary et al. | |
| 5,937,634 A | 8/1999 | Etheridge et al. | |
| 5,950,417 A | 9/1999 | Robertson, Jr. et al. | |
| 5,956,937 A | 9/1999 | Beichel | |
| 5,968,349 A | 10/1999 | Duyvesteyn et al. | |
| 5,974,780 A | 11/1999 | Santos | |
| 5,992,388 A | 11/1999 | Seger | |
| 6,016,658 A | 1/2000 | Willis et al. | |
| 6,032,465 A | 3/2000 | Regnier | |
| 6,035,641 A | 3/2000 | Lokhandwala | |
| 6,062,026 A | 5/2000 | Woollenweber et al. | |
| 6,079,974 A | 6/2000 | Thompson | |
| 6,082,093 A | 7/2000 | Greenwood et al. | |
| 6,089,855 A | 7/2000 | Becker et al. | |
| 6,094,916 A | 8/2000 | Puri et al. | |
| 6,101,983 A | 8/2000 | Anand et al. | |

(56) References Cited

U.S. PATENT DOCUMENTS

| | | | |
|---|---|---|---|
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,624 B1* | 8/2001 | Frutschi ............... F01K 21/047 60/39.52 |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,666 B1 | 9/2001 | Ginter ............... 60/39.05 |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,490,858 B2 | 12/2002 | Barrett et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,640,548 B2 | 11/2003 | Brushwood et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,957,539 B2* | 10/2005 | Lebas ............... B01D 53/1475 60/39.17 |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |

(56) References Cited

U.S. PATENT DOCUMENTS

| | | |
|---|---|---|
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |

(56) References Cited

U.S. PATENT DOCUMENTS

| | | |
|---|---|---|
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,555,796 B2 | 10/2013 | D'Agostini |
| 8,567,200 B2 | 10/2013 | Brook et al. |
| 8,616,294 B2 | 12/2013 | Zubrin et al. |
| 8,627,643 B2 | 1/2014 | Chillar et al. |
| 8,813,503 B2 * | 8/2014 | Jones ............... F02C 7/143 60/728 |
| 8,875,483 B2 | 11/2014 | Wettstein ............... 60/39.52 |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0006592 A1 * | 1/2007 | Balan ............... F02C 3/22 60/772 |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0276617 A1 * | 11/2008 | Mak ............... F02C 3/22 60/728 |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |

(56) References Cited

U.S. PATENT DOCUMENTS

| | | |
|---|---|---|
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096829 A1* | 4/2012 | West ............... F01K 23/10 60/39.24 |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | | |
|---|---|---|---|
| CA | 2645450 | 9/2007 | |
| CA | 2614669 | 12/2008 | |
| EP | 0453059 | 6/1994 | |
| EP | 0770771 | 5/1997 | |
| EP | 0654639 | 9/1998 | |
| FR | 2924951 | 6/2006 | ............ B01D 53/52 |
| GB | 0776269 | 6/1957 | |
| GB | 2117053 | 10/1983 | |
| GB | 2397349 | 7/2004 | |
| WO | WO95/21683 | 8/1995 | |
| WO | WO97/07329 | 2/1997 | |
| WO | WO99/06674 | 2/1999 | |
| WO | WO99/63210 | 12/1999 | |
| WO | WO2005/064232 | 7/2005 | |
| WO | WO2006/107209 | 10/2006 | |
| WO | WO2007/068682 | 6/2007 | |
| WO | WO2008/074980 | 6/2008 | |
| WO | WO2008/142009 | 11/2008 | |
| WO | WO2008/155242 | 12/2008 | |
| WO | WO2009/120779 | 10/2009 | |
| WO | WO2009/121008 | 10/2009 | |
| WO | WO2010/044958 | 4/2010 | |
| WO | WO2010/066048 | 7/2010 | |
| WO | WO2010/141777 | 12/2010 | |
| WO | WO2011/003606 | 1/2011 | |
| WO | WO2011/028322 | 3/2011 | |
| WO | WO2012/003076 | 1/2012 | |
| WO | WO2012/003077 | 1/2012 | |
| WO | WO2012/003078 | 1/2012 | |
| WO | WO2012/003079 | 1/2012 | |
| WO | WO2012/003080 | 1/2012 | |
| WO | WO2012003489 | 1/2012 | |
| WO | WO2012/018458 | 2/2012 | |
| WO | WO2012/018459 | 2/2012 | |
| WO | WO2012128928 | 9/2012 | |
| WO | WO2012128929 | 9/2012 | |
| WO | WO2012170114 | 12/2012 | |
| WO | WO2013147632 | 10/2013 | |
| WO | WO2013147633 | 10/2013 | |
| WO | WO2013155214 | 10/2013 | |
| WO | WO2013163045 | 10/2013 | |

OTHER PUBLICATIONS

Air Separation Technology Ion Transport Membrane—Air Products 2008.

Air Separation Technology Ion Transport Membrane—Air Products 2011.

Anderson, R. E. (2006) "Durability and Reliability Demonstration of a Near-Zero-Emission Gas-Fired Power Plant," *California Energy Comm.*, CEC 500-2006-074, 80 pgs.

Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.

(56) References Cited

OTHER PUBLICATIONS

Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.
BP Press Release (2006) "BP and Edison Mission Group Plan Major Hydrogen Power Project for California," Feb. 10, 2006, www.bp.com/hydrogenpower, 2 pgs.
Bryngelsson, M. et al. (2005) "Feasibility Study of CO2 Removal From Pressurized Flue Gas in a Fully Fired Combined Cycle—The Sargas Project," KTH—Royal Institute of Technology, Dept. Of Chemical Engineering and Technology, 9 pgs.
Clark, Hal (2002) "Development of a Unique Gas Generator for a Non-Polluting Power Plant," California Energy Commission Feasibility Analysis, P500-02-011F, Mar. 2002, 42 pgs.
Ditaranto, et al. , (2006), "Combustion Instabilities in Sudden Expansion Oxy-Fuel Flames," *ScienceDirect, Combustion and Flame*, v. 146, Jun. 30, 2006, 15 pgs.
Foy, Kirsten et al. (2005) "Comparison of Ion Transport Membranes" —Fourth Annual Conference on Carbon Capture and Sequestration, DOE/NETL; May 2005, 11 pages.
Cho, J. H. et al. (2005) "Marrying LNG and Power Generation," *Energy Markets*; Oct./Nov. 2005; 10, 8; ABI/INFORM Trade & Industry, p. 28.
Ciulia, Vincent. About.com. Auto Repair. How the Engine Works. 2001-2003.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, Aug. 7-12, 1988, pp. 41-44.
Cryogenics. Science Clarified. 2012. http://www.scienceclarified.com/Co-Di/Cryogenics.html.
Defrate, L. A. et al. (1959) "Optimum Design of Ejector Using Digital Computers" Chem. Eng. Prog. Symp. Ser., 55 ( 21) pp. 46.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.
Ertesvag, I. S. et al. (2005) "Energy Analysis of a Gas-Turbine Combined-Cycle Power Plant With Precombustion $CO_2$ Capture," Elsivier, 2004, pp. 5-39.
Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.
Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.
http://www.turbineinletcooling.org/resources/papers/CTIC_WetCompression_Shepherd_ASMETurboExpo2011.pdf , Shepherd, IGTI 2011—CTIC Wet Compression, Jun. 8, 2011.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.

Morehead, H. (2007) "Siemens Global Gasification and IGCC Update," *Siemens, Coal-Gen*, Aug. 3, 2007, 17 pgs.
Nanda, R. et al. (2007) "Utilizing Air Based Technologies as Heat Source for LNG Vaporization," presented at the $86^{th}$ Annual convention of the *Gas Processors of America* (GPA 2007), Mar. 11-14, 2007, San Antonio, TX.
Reeves, S. R. (2001) "Geological Sequestration of $CO_2$ in Deep, Unmineable Coalbeds: An Integrated Research and Commercial-Scale Field Demonstration Project," *SPE 71749*, 10 pgs.
Reeves, S. R. (2003) "Enhanced Coalbed Methane Recovery," *SPE 101466-DL*, 8 pgs.
Richards, G. A. et al. (2001) "Advanced Steam Generators," *National Energy Technology Laboratory*, 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the *Gas Processors of America* (GPA 2006), Grapevine, Texas, Mar. 5-8, 2006.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng.*, Norwegian Univ. of Science and Technology, 9 pgs.
vanHemert, P. et al. (2006) "Adsorption of Carbon Dioxide and a Hydrogen-Carbon Dioxide Mixture," *Intn'l Coalbed Methane Symposium* (Tuscaloosa, AL) Paper 0615, 9 pgs.
Zhu, J. et al. (2002) "Recovery of Coalbed Methane by Gas Injection," SPE 75255, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
PCT/RU2013/000162, filed Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, filed Apr. 10, 2013, General Electric Company/ ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

\* cited by examiner

SYSTEMS AND METHODS FOR CONTROLLING STOICHIOMETRIC COMBUSTION IN LOW EMISSION TURBINE SYSTEMS

CROSS REFERENCE TO RELATED APPLICATIONS

This application is the National Stage entry under 35 U.S.C. 371 of PCT/US2012/027772, that published as WO 2012/128925 and was filed on 5 Mar. 2012 which claims priority to U.S. Provisional Application 61/542,031, filed on 30 Sep. 2011 and U.S. Provisional Application 61/466,385, filed Mar. 22, 2011, each of which is incorporated by reference, it its entirety, for all purposes.

This application contains subject matter related to U.S. Provisional Application 61/542,039 filed Sep. 30, 2011 (PCT/US2012/027780, that published as WO 2012/128928 and was filed on 5 Mar. 2012); U.S. Provisional Application 61/542,041 filed Sep. 30, 2011 (PCT/US2012/027781, that published as WO 2012/128929 and was filed on 5 Mar. 2012; U.S. Provisional Application 61/542,037 filed Sep. 30, 2011 (PCT/US2012/027776, that published as WO 2012/128927 and was filed on 5 Mar. 2012); U.S. Provisional Application 61/542,036 filed Sep. 30, 2011 (PCT/US2012/027774, that published as WO 2012/128926 and was filed on 5 Mar. 2012); U.S. Provisional Application 61/466,384 filed Mar. 22, 2011 and U.S. Provisional Application 61/542,030 filed 30 Sep. 2011 (PCT/2012/027769, that published as WO 2012/128923 and was filed on 5 Mar. 2012); and U.S. Provisional Application 61/466,381 filed Mar. 22, 2011 and U.S. Provisional Application 61/542,035 filed Sep. 30, 2011 (PCT/US2012/027770, that published as WO 2012/128924 and was filed on 5 Mar. 2012).

FIELD OF THE DISCLOSURE

Embodiments of the disclosure relate to low emission power generation. More particularly, embodiments of the disclosure relate to methods and apparatus for controlling the supply of oxidant to the combustion chamber of a low emission turbine system to achieve and maintain stoichiometric or substantially stoichiometric combustion conditions.

BACKGROUND OF THE DISCLOSURE

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR.

There is also a global concern regarding green house gas (GHG) emissions. This concern combined with the implementation of cap-and-trade policies in many countries makes reducing $CO_2$ emissions a priority for those countries as well as for the companies that operate hydrocarbon production systems therein.

Some approaches to lower $CO_2$ emissions include fuel de-carbonization or post-combustion capture using solvents, such as amines. However, both of these solutions are expensive and reduce power generation efficiency, resulting in lower power production, increased fuel demand and increased cost of electricity to meet domestic power demand. In particular, the presence of oxygen, $SO_X$, and $NO_X$ components makes the use of amine solvent absorption very problematic. Another approach is an oxyfuel gas turbine in a combined cycle (e.g., where exhaust heat from the gas turbine Brayton cycle is captured to make steam and produce additional power in a Rankin cycle). However, there are no commercially available gas turbines that can operate in such a cycle and the power required to produce high purity oxygen significantly reduces the overall efficiency of the process.

Moreover, with the growing concern about global climate change and the impact of carbon dioxide emissions, emphasis has been placed on minimizing carbon dioxide emissions from power plants. Gas turbine combined cycle power plants are efficient and have a lower cost compared to nuclear or coal power generation technologies. Capturing carbon dioxide from the exhaust of a gas turbine combined cycle power plant is very expensive for the following reasons: (a) the low concentration of carbon dioxide in the exhaust stack, (b) the large volume of gas that needs to be treated, (c) the low pressure of the exhaust stream, and the large amount of oxygen that is present in the exhaust stream. All of these factors result in a high cost of carbon dioxide capture from combined cycle plants.

Accordingly, there is still a substantial need for a low emission, high efficiency power generation and $CO_2$ capture manufacturing process.

SUMMARY OF THE DISCLOSURE

In the combined cycle power plants described herein, exhaust gases from low emission gas turbines, which are vented in a typical natural gas combined cycle (NGCC) plant, are instead cooled and recycled to the gas turbine main compressor inlet. The recycle exhaust gases, rather than excess compressed fresh air, are used to cool the products of combustion down to the material limitations in the expander. The present apparatus, systems, and methods enable low emission turbines to maintain a preferred combustion regime, e.g., stoichiometric combustion, over a large range of ambient conditions. By combining stoichiometric combustion with exhaust gas recycle, the concentration of $CO_2$ in the recirculating gases is increased while minimizing the presence of excess $O_2$, both of which make $CO_2$ recovery easier. In one or more embodiments, the low emission turbine systems described herein employ air as the oxidant.

The present invention is directed to systems, methods, and apparatus for controlling the oxidant feed in low emission turbine systems so as to maintain stoichiometric or substantially stoichiometric combustion conditions. In one or more embodiments, such control is achieved through methods or systems that ensure delivery of a consistent mass flow rate of oxidant to the combustion chamber. Examples include, but are not limited to, various configurations for adding recycled exhaust gas to the oxidant feed to maintain a desired oxygen content in the oxidant feed. These configurations may optionally include one or more other control methods such as ratio controllers or modifying the temperature of the feed in addition to adding recycled exhaust gas to the oxidant feed.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

As used herein, the term "natural gas" refers to a multi-component gas obtained from a crude oil well (associated gas) and/or from a subterranean gas-bearing formation (non-associated gas). The composition and pressure of natural gas can vary significantly. A typical natural gas stream contains methane ($CH_4$) as a major component, i.e. greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof The natural gas can also contain minor amounts of contaminants such as water, nitrogen, iron sulfide, wax, crude oil, or any combination thereof As used herein, the term "stoichiometric combustion" refers to a combustion reaction having a volume of reactants comprising a fuel and an oxidizer and a volume of products formed by combusting the reactants where the entire volume of the reactants is used to form the products. As used herein, the term "substantially stoichiometric" combustion refers to a combustion reaction having an equivalence ratio ranging from about 0.9:1 to about 1.1:1, or more preferably from about 0.95:1 to about 1.05:1. Use of the term "stoichiometric" herein is meant to encompass both stoichiometric and substantially stoichiometric conditions unless otherwise indicated.

As used herein, the term "stream" refers to a volume of fluids, although use of the term stream typically means a moving volume of fluids (e.g., having a velocity or mass flow rate). The term "stream," however, does not require a velocity, mass flow rate, or a particular type of conduit for enclosing the stream.

Embodiments of the presently disclosed systems and processes may be used to produce ultra low emission electric power and $CO_2$ for enhanced oil recovery (EOR) or sequestration applications. According to embodiments disclosed herein, a mixture of air and fuel can be stoichiometrically combusted and simultaneously mixed with a stream of recycled exhaust gas. The stream of recycled exhaust gas, generally including products of combustion such as $CO_2$, can be used as a diluent to control or otherwise moderate the temperature of the stoichiometric combustion and flue gas entering the succeeding expander.

Combustion at near stoichiometric conditions (or "slightly rich" combustion) can prove advantageous in order to eliminate the cost of excess oxygen removal. By cooling the flue gas and condensing the water out of the stream, a relatively high content $CO_2$ stream can be produced. While a portion of the recycled exhaust gas can be utilized for temperature moderation in a closed Brayton cycle, the remaining purge stream can be used for EOR applications and electric power can be produced with little or no $SO_X$, $NO_R$, or $CO_2$ being emitted to the atmosphere. For example, the purge stream can be treated in a $CO_2$ separator adapted to discharge a nitrogen-rich gas which can be subsequently expanded in a gas expander to generate additional mechanical power. The result of the systems disclosed herein is the production of power and the manufacturing or capture of additional $CO_2$ at a more economically efficient level. In order to avoid deviations from stoichiometric conditions, however, the amount of oxidant supplied to the combustor must be closely controlled. The present invention provides systems and methods for achieving such control.

In one or more embodiments, the present invention is directed to integrated systems comprising an inlet compressor, a gas turbine system, and an exhaust gas recirculation system. The gas turbine system comprises a combustion chamber configured to combust one or more oxidants and one or more fuels in the presence of a compressed recycle stream. The inlet compressor compresses the one or more oxidants and directs a compressed oxidant stream to the combustion chamber. The combustion chamber directs a first discharge stream to an expander to generate a gaseous exhaust stream and at least partially drive a main compressor, and the main compressor compresses the gaseous exhaust stream and thereby generates the compressed recycle stream. In one or more embodiments of the invention, a portion of the exhaust gas is diverted from the exhaust gas recycle system and combined with the one or more oxidants to form a combined oxidant-exhaust stream that is directed to the combustion chamber. The amount of exhaust gas diverted may be varied so that stoichiometric or substantially stoichiometric reaction conditions are maintained in the combustion chamber.

The diverted exhaust gas may be taken from any point in the exhaust gas recycle system, and may be combined with the one or more oxidants at any point before the oxidants enter the combustion chamber. For example, in one or more embodiments, the portion of the exhaust gas diverted from the exhaust gas recycle system is combined with the one or more oxidants upstream of the inlet compressor. Alternately, the portion of the exhaust gas diverted from the exhaust gas recycle system may be combined with the compressed oxidants downstream of the inlet compressor but before the compressed oxidants enter the combustion chamber.

In one or more embodiments, the portion of the exhaust gas diverted from the exhaust gas recycle system may be extracted from the main compressor and injected into the inlet compressor. Each of the main compressor and the inlet compressor may have one or more stages. In certain embodiments, the main compressor has two or more stages and the diverted exhaust gas is withdrawn from the main compressor at an interstage location (i.e., between stages). In the same or other embodiments, the inlet compressor has two or more stages and the diverted exhaust gas is injected into the inlet compressor at an interstage location.

In some embodiments, the exhaust gas recirculation system may comprise at least one cooling unit configured to receive and cool the gaseous exhaust stream and at least one blower configured to receive and increase the pressure of the gaseous exhaust stream before directing a cooled recycle gas to the main compressor. In such embodiments, the portion of the exhaust gas diverted from the exhaust gas recycle system may be diverted from the gaseous exhaust stream entering the blower, or from the gaseous exhaust stream flowing from the blower to the cooling unit, or from the gaseous exhaust stream exiting the cooling unit, and may be combined with the one or more oxidants at any point before the oxidants enter the combustion chamber.

In one or more embodiments, the integrated systems may optionally further comprise one or more controllers configured to adjust the flow of the combined oxidant-exhaust stream and the one or more fuels into the combustion chamber to maintain a chosen flow ratio and therefore a fixed ratio of oxidant to fuel. The one or more controllers may be any type of controller suitable for adjusting the inlet streams to the combustion chamber, such as for example a ratio controller. In one or more embodiments, the ratio controller may be configured to receive measurements from one or more flow meters installed on one or more of the inlet streams to the combustion chamber and, based on the measurements received from the flow meters, open or close one or more valves to change the flow of one or more of the inlet streams accordingly. In this manner, the one or more controllers provide an additional level of control beyond that provided by combining a portion of the exhaust gas with the oxidant feed. The one or more controllers may also be used alone, as the sole method of controlling the oxidant feed to maintain stoichiometric or substantially stoichiometric combustion.

In one or more embodiments, the integrated system may further comprise one or more cooling devices configured to cool the one or more oxidants (or the combined oxidant-exhaust stream in cases where the diverted portion of exhaust gas is combined with the oxidant upstream of the inlet compressor) before introduction to the inlet compressor. For example, the oxidant may be cooled to a temperature that is at least about 5° F., or at least about 10° F., or at least about 15° F., or at least about 20° F., or at least about 25° F., or at least about 30° F., or at least about 35° F., or at least about 40° F. lower than the ambient air temperature. In the same or other embodiments, the temperature difference between the oxidant entering the cooling device and the oxidant exiting the cooling device is at least about 5° F., or at least about 10° F., or at least about 15° F., or at least about 20° F., or at least about 25° F., or at least about 30° F., or at least about 35° F., or at least about 40° F. In one or more embodiments, the cooling device may be one or more heat exchangers, mechanical refrigeration units, direct contact coolers, trim coolers, or similar devices and combinations thereof. Additionally, the cooling device may employ any known cooling fluid suitable for such applications, such as chilled water or seawater, or refrigerants such as for example non-halogenated hydrocarbons, fluorocarbons, hydrofluorocarbons, chlorofluorocarbons, hydrochlorofluorocarbons, anhydrous ammonia, propane, carbon dioxide, propylene, and the like. In certain embodiments, the system may further comprise a separator configured to receive cooled oxidant from the cooling device and remove any water droplets from the oxidant stream before introduction to the inlet compressor. The separator may be any device suitable for the intended use, such as for example a vane pack, mesh pad, or other demisting device.

In one or more embodiments, the present invention also provides methods for generating power. The methods comprise compressing one or more oxidants in an inlet compressor to form a compressed oxidant; combusting the compressed oxidant and at least one fuel in a combustion chamber in the presence of a compressed recycle exhaust gas and under stoichiometric or substantially stoichiometric conditions, thereby generating a discharge stream; expanding the discharge stream in an expander to at least partially drive a main compressor and generate a gaseous exhaust stream; directing the gaseous exhaust stream to an exhaust gas recirculation system; and diverting a portion of the exhaust gas from the exhaust gas recycle system and combining the diverted portion of exhaust gas with the one or more oxidants to form a combined oxidant-exhaust stream that is directed to the combustion chamber. The diverted exhaust gas may be taken from any point in the exhaust gas recycle system, and may be combined with the one or more oxidants at any point before the oxidants enter the combustion chamber. The main compressor compresses the gaseous exhaust stream and thereby generates the compressed recycle stream. In some methods of the present invention, the exhaust gas recirculation system may comprise at least one cooling unit and at least one blower, such that the gaseous exhaust stream is cooled in at the least one cooling unit and the pressure of the gaseous exhaust stream is increased in the at least one blower, thereby generating a cooled recycle gas directed to the main compressor.

In one or more embodiments, methods of the invention may further comprise adjusting the flow of the combined oxidant-exhaust stream and the one or more fuels into the combustion chamber to maintain a fixed ratio of oxidant to fuel. The flow may be controlled via a ratio controller or similar device. In the same or other embodiments, methods of the invention may further comprise cooling the one or more oxidants before introduction to the inlet compressor and optionally removing water droplets from the cooled oxidant stream before introduction to the inlet compressor.

By diverting and combining a portion of the recycled exhaust gas with the oxidant feed in the systems and methods described herein, more precise control may be exerted over the amount of oxidant fed to the combustion chamber. Specifically, the mass density of the oxidant feed is allowed to float based on ambient temperature and pressure conditions, but the amount of oxygen per cubic foot in the combined oxidant-exhaust feed is kept at a constant level by varying the amount of recycle gas provided to the oxidant feed. When more oxygen is required, the amount of recycle gas mixed with the oxidant feed is reduced, and when less oxygen is required, the amount of recycle gas mixed with the oxidant feed is increased. In this manner, changes in the oxygen level of the oxidant feed caused by temperature changes, pressure changes, air quality, humidity, and the like can be accommodated and stoichiometric combustion conditions can be maintained regardless of variations elsewhere in the system or in the outside environment.

Figure 1:
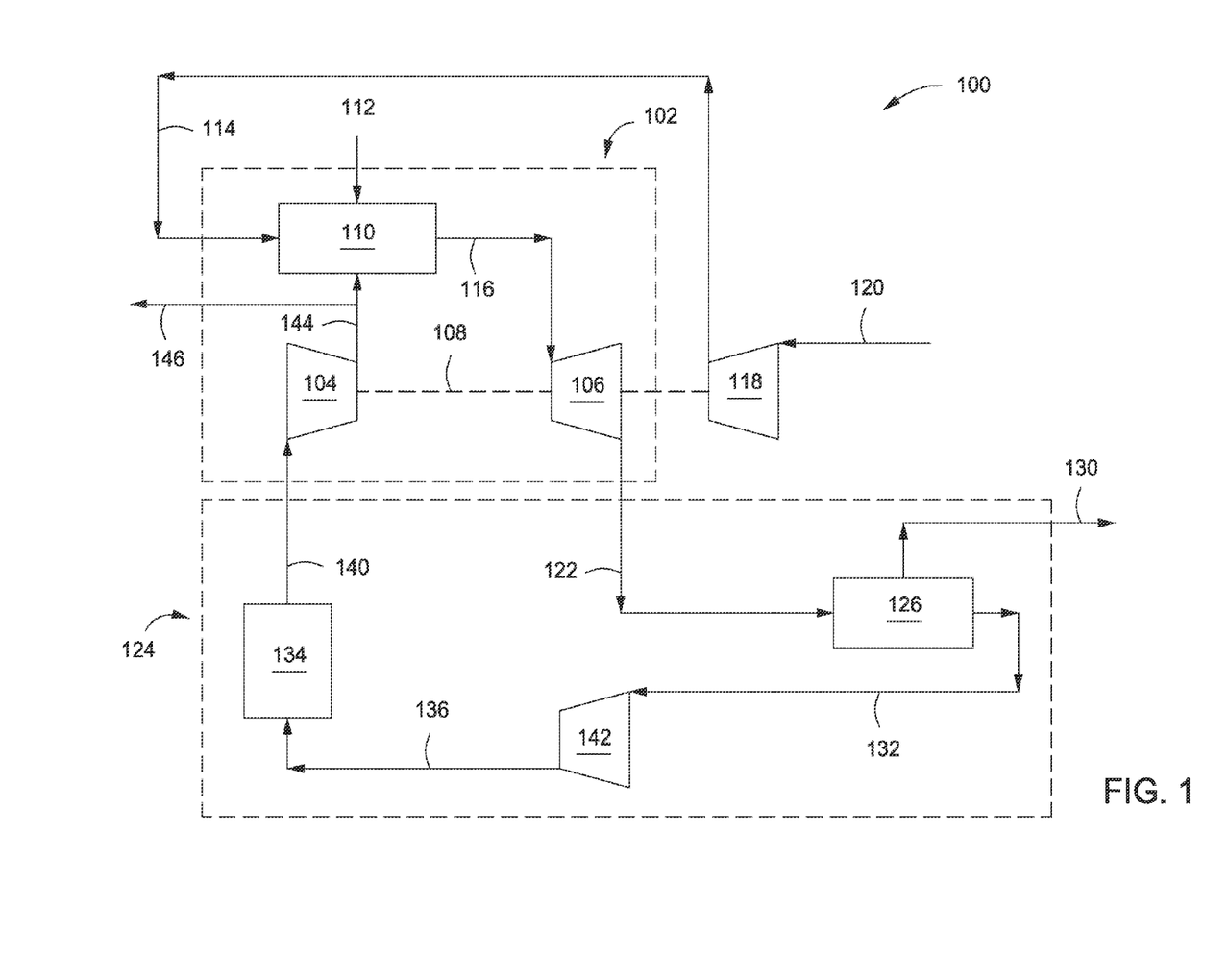
FIG. 1 depicts an integrated system for low emission power generation and enhanced $CO_2$ recovery.

Referring now to the figures, various embodiments of the present invention may be best understood with reference to a base case, shown in FIG. 1. FIG. 1 illustrates a power generation system 100 configured to provide an improved post-combustion $CO_2$ capture process. In at least one embodiment, the power generation system 100 can include a gas turbine system 102 that can be characterized as a closed Brayton cycle. In one embodiment, the gas turbine system 102 can have a first or main compressor 104 coupled to an expander 106 through a common shaft 108 or other mechanical, electrical, or other power coupling, thereby allowing a portion of the mechanical energy generated by the expander 106 to drive the compressor 104. The expander 106 may generate power for other uses as well, such as to power a second or inlet compressor 118. The gas turbine system 102 can be a standard gas turbine, where the main compressor 104 and expander 106 form the compressor and expander ends, respectively, of the standard gas turbine. In other embodiments, however, the main compressor 104 and expander 106 can be individualized components in a system 102.

The gas turbine system 102 can also include a combustion chamber 110 configured to combust a fuel stream 112 mixed with a compressed oxidant 114. In one or more embodiments, the fuel stream 112 can include any suitable hydrocarbon gas or liquid, such as natural gas, methane, naphtha, butane, propane, syngas, diesel, kerosene, aviation fuel, coal derived fuel, bio-fuel, oxygenated hydrocarbon feedstock, or combinations thereof. The compressed oxidant 114 can be derived from a second or inlet compressor 118 fluidly coupled to the combustion chamber 110 and adapted to compress a feed oxidant 120. While the discussion herein assumes that the feed oxidant 120 is ambient air, the oxidant may comprise any suitable gas containing oxygen, such as air, oxygen-rich air, or combinations thereof As will be described in more detail below, the combustion chamber 110 can also receive a compressed recycle stream 144, including a flue gas primarily having $CO_2$ and nitrogen components. The compressed recycle stream 144 can be derived from the main compressor 104 and adapted to help facilitate the combustion of the compressed oxidant 114 and fuel 112, and also increase the $CO_2$ concentration in the working fluid. A discharge stream 116 directed to the inlet of the expander 106 can be generated as a product of combustion of the fuel stream 112 and the compressed oxidant 114, in the presence of the compressed recycle stream 144. In at least one embodiment, the fuel stream 112 can be primarily natural gas, thereby generating a discharge 116 including volumetric portions of vaporized water, $CO_2$, nitrogen, nitrogen oxides ($NO_X$), and sulfur oxides ($SO_X$). In some embodiments, a small portion of unburned fuel 112 or other compounds may also be present in the discharge 116 due to combustion equilibrium limitations. As the discharge stream 116 expands through the expander 106 it generates mechanical power to drive the main compressor 104, or other facilities, and also produces a gaseous exhaust stream 122 having a heightened $CO_2$ content.

The power generation system 100 can also include an exhaust gas recirculation (EGR) system 124. While the EGR system 124 illustrated in the figures incorporates various apparatus, the illustrated configurations are representative only and any system that recirculates the exhaust gas 122 back to the main compressor to accomplish the goals stated herein may be used. In one or more embodiments, the EGR system 124 can include a heat recovery steam generator (HRSG) 126, or similar device. The gaseous exhaust stream 122 can be sent to the HRSG 126 in order to generate a stream of steam 130 and a cooled exhaust gas 132. The steam 130 can optionally be sent to a steam gas turbine (not shown) to generate additional electrical power. In such configurations, the combination of the HRSG 126 and the steam gas turbine can be characterized as a closed Rankine cycle. In combination with the gas turbine system 102, the HRSG 126 and the steam gas turbine can form part of a combined-cycle power generating plant, such as a natural gas combined-cycle (NGCC) plant.

In one or more embodiments, the cooled exhaust gas 132 exiting the HRSG 126 may be sent to at least one cooling unit 134 configured to reduce the temperature of the cooled exhaust gas 132 and generate a cooled recycle gas stream 140. In one or more embodiments, the cooling unit 134 is considered herein to be a direct contact cooler (DCC), but may be any suitable cooling device such as a direct contact cooler, trim cooler, a mechanical refrigeration unit, or combinations thereof The cooling unit 134 can also be configured to remove a portion of condensed water via a water dropout stream (not shown). In one or more embodiments, the cooled exhaust gas stream 132 can be directed to a blower or boost compressor 142 fluidly coupled to the cooling unit 134. In such embodiments, compressed exhaust gas stream 136 exits the blower 142 and is directed to the cooling unit 134.

The blower 142 can be configured to increase the pressure of the cooled exhaust gas stream 132 before it is introduced into the main compressor 104. In one or more embodiments, the blower 142 increases the overall density of the cooled exhaust gas stream 132, thereby directing an increased mass flow rate for the same volumetric flow to the main compressor 104. Because the main compressor 104 is typically volume-flow limited, directing more mass flow through the main compressor 104 can result in a higher discharge pressure from the main compressor 104, thereby translating into a higher pressure ratio across the expander 106. A higher pressure ratio generated across the expander 106 can allow for higher inlet temperatures and, therefore, an increase in expander 106 power and efficiency. This can prove advantageous since the $CO_2$-rich discharge 116 generally maintains a higher specific heat capacity. Accordingly, the cooling unit 134 and the blower 142, when incorporated, may each be adapted to optimize or improve the operation of the gas turbine system 102.

The main compressor 104 can be configured to compress the cooled recycle gas stream 140 received from the EGR system 124 to a pressure nominally above the combustion chamber 110 pressure, thereby generating the compressed recycle stream 144. In at least one embodiment, a purge stream 146 can be tapped from the compressed recycle stream 144 and subsequently treated in a $CO_2$ separator or other apparatus (not shown) to capture $CO_2$. The separated $CO_2$ can be used for sales, used in another process requiring carbon dioxide, and/or compressed and injected into a terrestrial reservoir for enhanced oil recovery (EOR), sequestration, or another purpose.

The EGR system 124 as described herein can be implemented to achieve a higher concentration of $CO_2$ in the working fluid of the power generation system 100, thereby allowing for more effective $CO_2$ separation for subsequent sequestration, pressure maintenance, or EOR applications. For instance, embodiments disclosed herein can effectively increase the concentration of $CO_2$ in the flue gas exhaust stream to about 10 wt % or higher. To accomplish this, the combustion chamber 110 is adapted to stoichiometrically combust the incoming mixture of fuel 112 and compressed oxidant 114. In order to moderate the temperature of the stoichiometric combustion to meet expander 106 inlet temperature and component cooling requirements, a portion of the exhaust gas derived from the compressed recycle stream 144 can be injected into the combustion chamber 110 as a diluent. Thus, embodiments of the disclosure can essentially eliminate any excess oxygen from the working fluid while simultaneously increasing its $CO_2$ composition. As such, the gaseous exhaust stream 122 can have less than about 3.0 vol % oxygen, or less than about 1.0 vol % oxygen, or less than about 0.1 vol % oxygen, or even less than about 0.001 vol % oxygen.

In some embodiments not depicted herein, high pressure steam may also be employed as a diluent in the combustion chamber, either in place of or in addition to the recycled exhaust gas. In such embodiments, the addition of steam would reduce power and size requirements in the EGR system (or eliminate the EGR system altogether), but would require the addition of a water recycle loop.

Additionally, in further embodiments not depicted herein, the compressed oxidant feed to the combustion chamber may comprise argon. For example, the oxidant may comprise from about 0.1 to about 5.0 vol % argon, or from about 1.0 to about 4.5 vol % argon, or from about 2.0 to about 4.0 vol % argon, or from about 2.5 to about 3.5 vol % argon, or about 3.0 vol % argon. As will be appreciated by those skilled in the art, incorporating argon into the compressed oxidant feed may require the addition of a cross exchanger or similar device between the main compressor and the combustion chamber configured to remove excess $CO_2$ from the recycle stream and return argon to the combustion chamber at the appropriate temperature for combustion.

FIGS. 2 through 5 illustrate modifications to the reference system 100 depicted in FIG. 1 that are intended to allow more precise control over the amount of oxidant fed to the combustion chamber 110 by adding a varying amount of recycled exhaust gas to the oxidant feed to accommodate changes in the oxygen level of the oxidant feed caused by temperature changes, pressure changes, air quality, humidity, and the like. Increased control over the oxidant feed allows for consistent maintenance of stoichiometric combustion conditions regardless of variations elsewhere in the system or in the outside environment. In one or more embodiments of the invention including but not limited to those depicted in FIGS. 2 through 5, the amount of oxygen required in the feed to the combustion chamber, and therefore the amount of recycle gas combined with the oxidant feed, may be determined by employing sensors (not shown) to measure desired properties such as the levels of oxygen, carbon dioxide, and unburned hydrocarbons in the exhaust gas exiting the expander. Based on such measurements, a metering valve (also not shown) may be used to control the mixture of exhaust gas and oxidant feed to ensure the proper proportions in the combined oxidant-exhaust feed.

Figure 2:
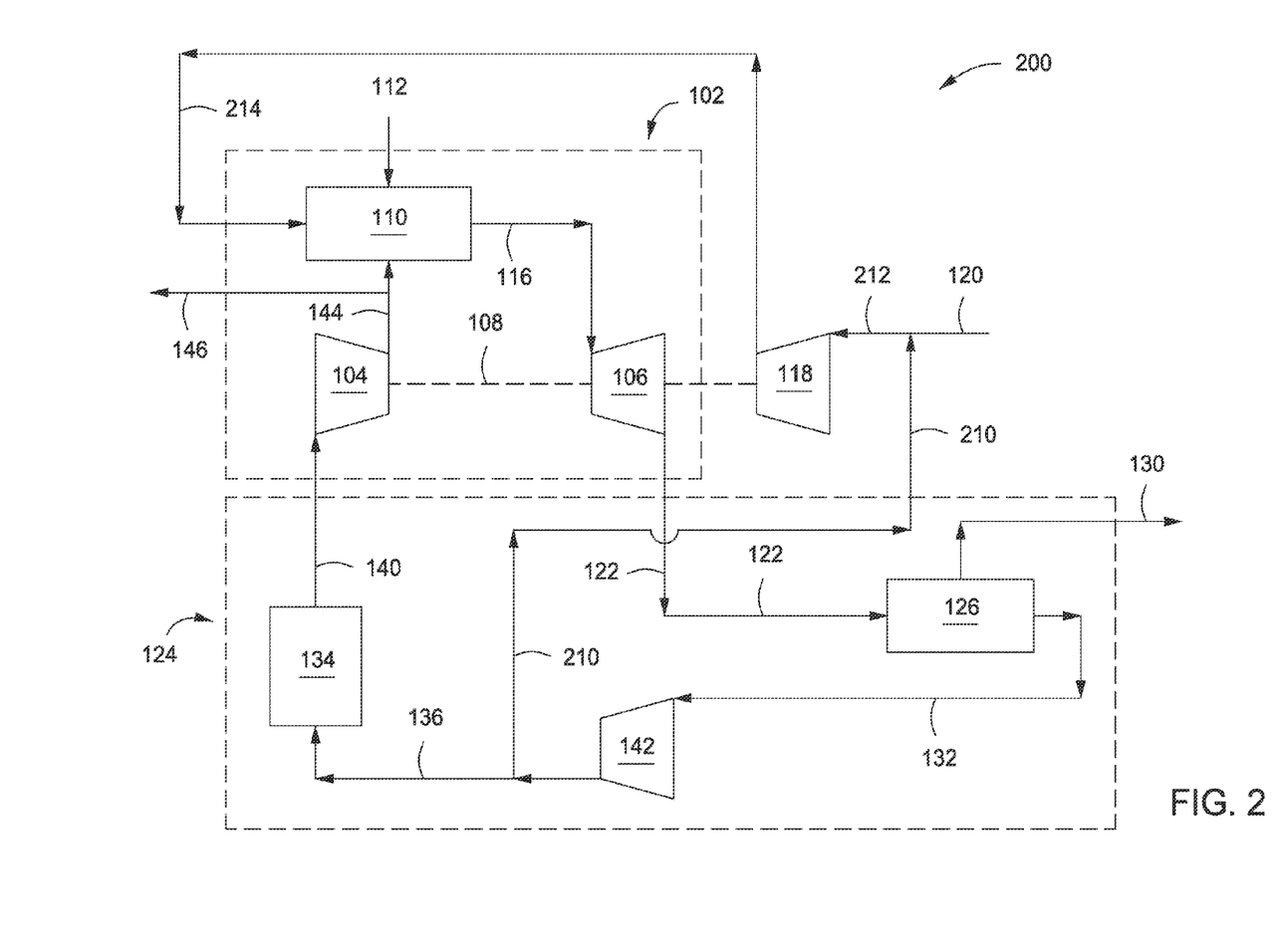
FIG. 2 depicts an integrated system for low emission power generation and enhanced $CO_2$ recovery in which a portion of the recycled exhaust gas is diverted from the recycle stream between the recycle blower and the cooling unit and added to the inlet compressor feed.

Referring now to FIG. 2, depicted is an alternative configuration of the power generation system 100 of FIG. 1, embodied and described as system 200. As such, FIG. 2 may be best understood with reference to FIG. 1. In system 200 of FIG. 2, a portion of the circulating exhaust gas is diverted and combined with the oxidant feed 120 entering the inlet compressor 118 so that the amount of oxygen in the feed to the inlet compressor (and therefore the combustion chamber 110) may be maintained at a consistent level regardless of changes in the composition of the oxidant feed 120. As shown in FIG. 2, a portion of compressed exhaust gas stream 136 is diverted via stream 210 and added to the oxidant feed 120 to form a combined oxidant-exhaust feed 212. The mass density of the oxidant feed is allowed to float based on ambient temperature and pressure conditions, but the amount of oxygen per cubic foot in the combined oxidant-exhaust feed 212 is kept at a constant level by varying the amount of recycle gas provided to the feed via stream 210. When more oxygen is required, the amount of recycle gas mixed with the oxidant feed is reduced, and when less oxygen is required, the amount of recycle gas mixed with the oxidant feed is increased. In this manner, not only are stoichiometric conditions maintained in the combustor, but the required duty of the main compressor 104 may also be reduced, thereby further increasing the efficiency of the system 200. The combined oxidant-exhaust feed 212 is directed to the inlet compressor 118 and compressed to form compressed oxidant-exhaust stream 214. Upon exiting the inlet compressor 118, compressed oxidant-exhaust stream 214 is fed to the combustion chamber 110 and the remainder of the system 200 operates in the same fashion as the system 100 of FIG. 1 described previously.

Figure 3:
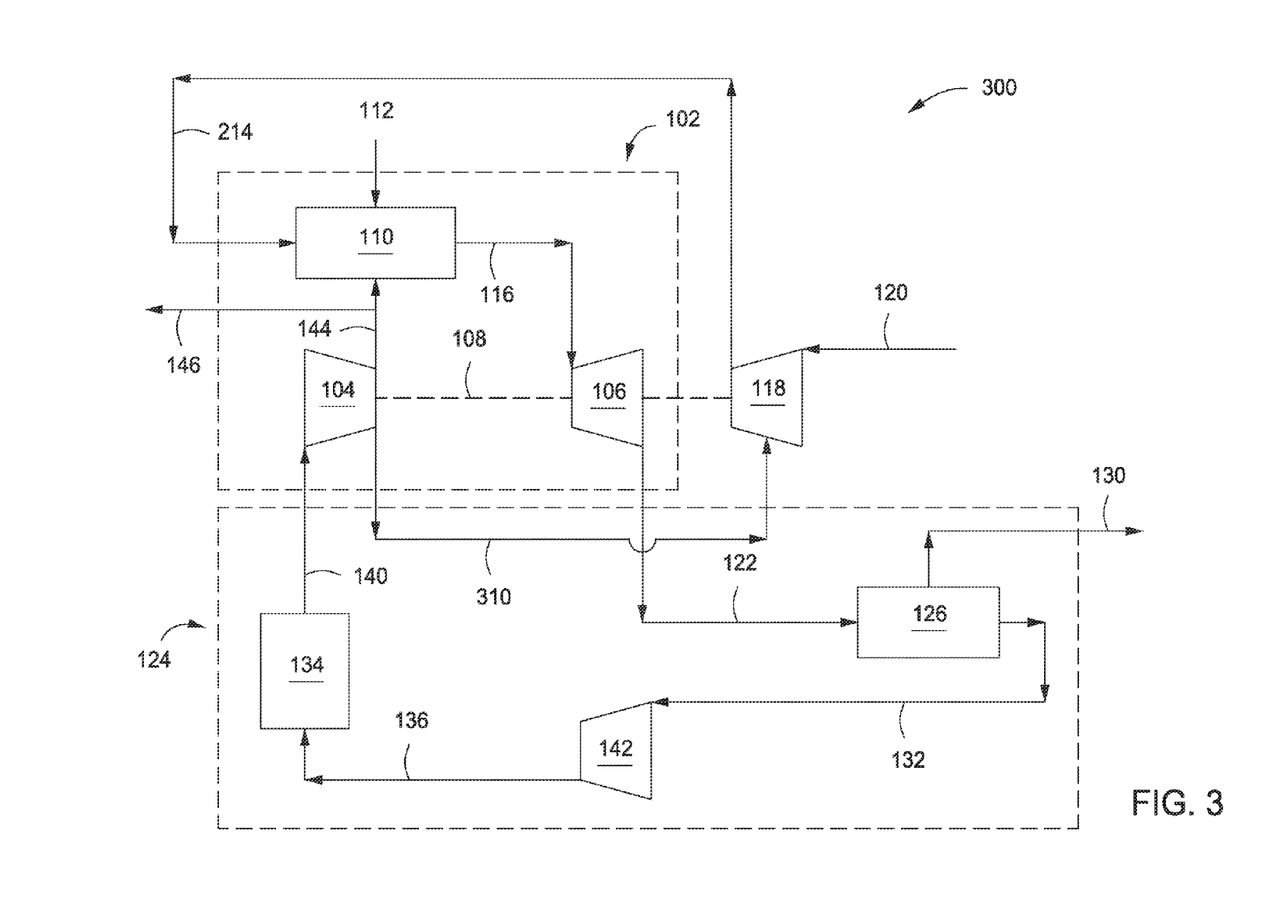
FIG. 3 depicts an integrated system for low emission power generation and enhanced $CO_2$ recovery in which a portion of the recycled exhaust gas is diverted from the main compressor and added to the inlet compressor at an interstage location.

Referring now to FIG. 3, depicted is an alternative configuration of the power generation system 100 of FIG. 1, embodied and described as system 300, in which recycled exhaust gas is used to maintain a constant level of oxygen in the feed to the combustor in a similar manner to that described above with respect to FIG. 2. As such, FIG. 3 may be best understood with reference to FIGS. 1 and 2. In system 300 of FIG. 3, a portion of the cooled recycle exhaust gas is withdrawn from the main compressor 104 via stream 310 and injected to the inlet compressor 118 at an interstage location. Compressed oxidant-exhaust stream 214 then exits the inlet compressor and is directed to the combustion chamber 110, and the remainder of the system 300 operates in the same fashion as the system 100 of FIG. 1, described previously. As in system 200 of FIG. 2, the mass density of the oxidant feed is allowed to float based on ambient temperature and pressure conditions, but the amount of oxygen per cubic foot in the compressed oxidant-exhaust feed 214 is kept at a constant level by varying the amount of recycle gas provided to the feed via stream 310.

Figure 4:
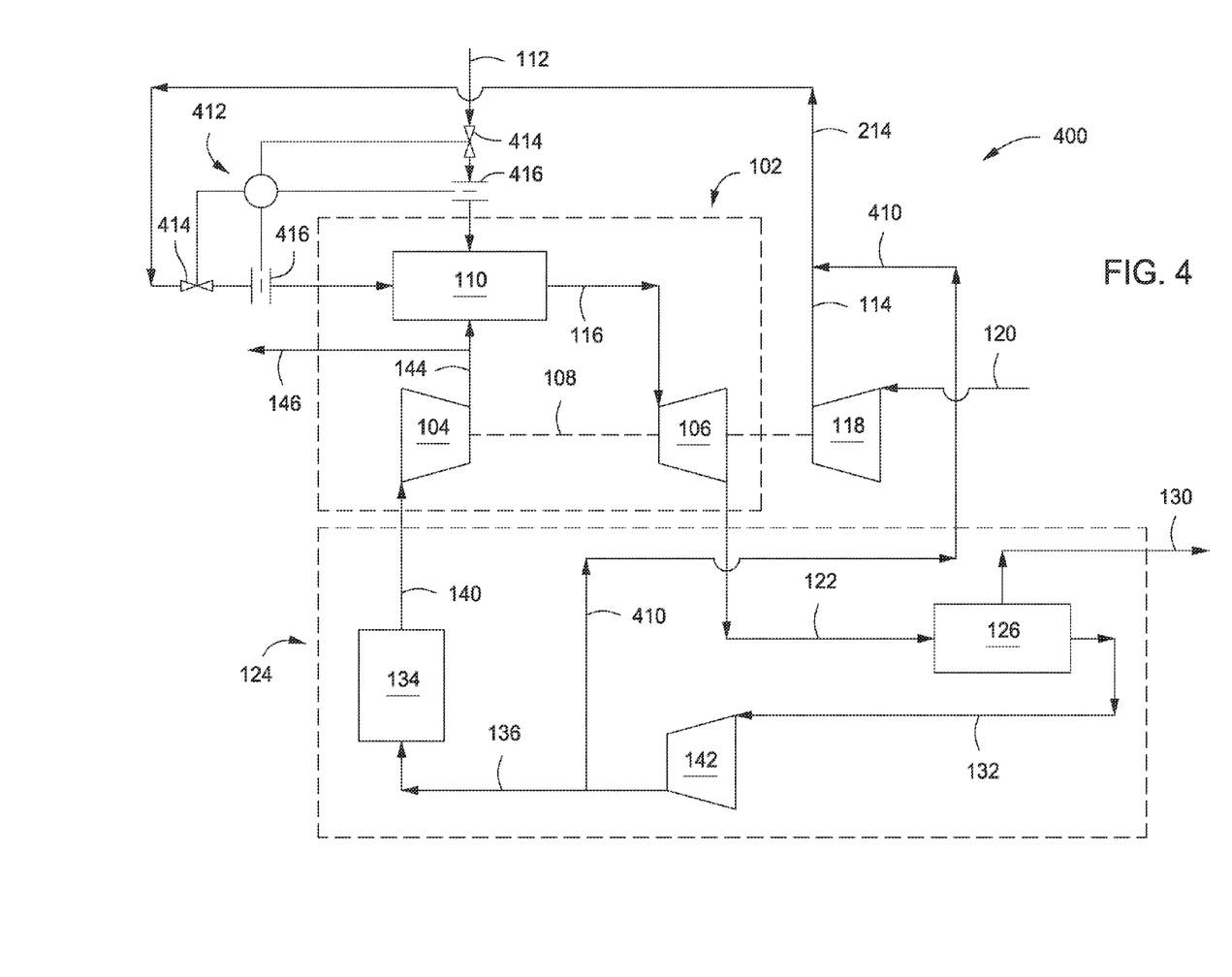
FIG. 4 depicts an integrated system for low emission power generation and enhanced $CO_2$ recovery in which a portion of the recycled exhaust gas is diverted from the recycle stream between the recycle blower and the cooling unit and added to the compressed oxidant feed. The system includes an optional ratio controller on the oxidant and fuel feeds.

Referring now to FIG. 4, depicted is an alternative configuration of the power generation system 100 of FIG. 1, embodied and described as system 400, in which recycled exhaust gas is used to maintain a constant level of oxygen in the feed to the combustor in a similar manner to that described above with respect to FIG. 2. As such, FIG. 4 may be best understood with reference to FIGS. 1 and 2. In system 400 of FIG. 4, a portion of compressed exhaust gas stream 136 is diverted via stream 410 and added to the compressed oxidant 114 exiting the inlet compressor 118 to form compressed oxidant-exhaust stream 214. Compressed oxidant-exhaust stream 214 is directed to the combustion chamber 110, and the remainder of the system 400 operates in the same fashion as the system 100 of FIG. 1, described previously. As in system 200 of FIG. 2, the mass density of the oxidant feed is allowed to float based on ambient temperature and pressure conditions, but the amount of oxygen per cubic foot in the compressed oxidant-exhaust feed 214 is kept at a constant level by varying the amount of recycle gas provided to the feed via stream 410.

FIG. 4 also depicts an optional additional level of control, provided by a ratio controller 412. Ratio controller 412 adjusts the flow of one or both of the fuel feed 112 and the compressed oxidant-exhaust feed 214 to maintain a consistent ratio of fuel to oxidant entering the combustion chamber 110 at all times. Flow meters 416 are installed on the fuel feed and the oxidant-exhaust feed streams. Measurements provided by the flow meters 416 are communicated to the ratio controller 412, which then automatically adjusts valves 414 to increase or decrease flow in one or both of the fuel 112 and oxidant-exhaust 214 feeds. In this manner, the ratio controller 412 provides a second method of dynamic, real-time control in addition to the first level of control provided by combining recycled exhaust gas with the oxidant feed.

It will be apparent to those skilled in the art that one or more ratio controllers may be used as described above regardless of the configuration of the exhaust gas recycle circuit or the location where a portion of the exhaust gas is added to the oxidant feed. Additionally, one or more ratio controllers may be used as a sole method of stoichiometric control, without also adding a portion of the exhaust gas to the oxidant feed. Any such configurations or modifications are contemplated herein and considered to be within the scope of the invention.

Figure 5:
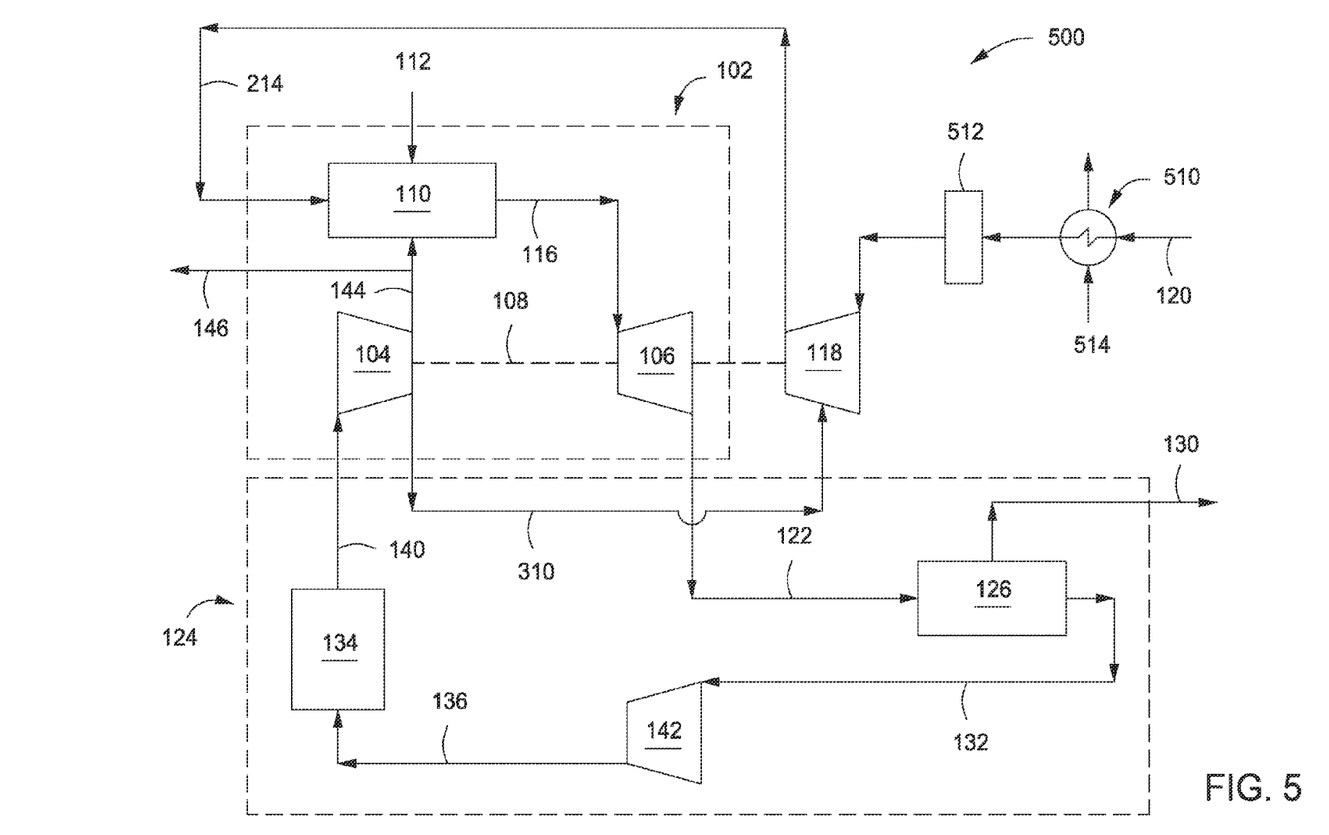
FIG. 5 depicts an integrated system for low emission power generation and enhanced $CO_2$ recovery similar in configuration to FIG. 3, in which the oxidant feed is chilled prior to entering the inlet compressor.

Referring now to FIG. 5, depicted is an alternate configuration of the power generation system 100 of FIG. 1, embodied and described as system 500, in which recycled exhaust gas is used to maintain a constant level of oxygen in the feed to the combustor in a similar manner to that described above with respect to FIG. 3. As such, FIG. 5 may be best understood with reference to FIGS. 1 and 3. In system 500 of FIG. 5, a portion of the cooled recycle exhaust gas is withdrawn from the main compressor 104 via stream 310 and injected to the inlet compressor 118 at an interstage location as in system 300 of FIG. 3.

FIG. 5 also depicts an optional additional level of control provided by chilling the feed oxidant 120 before the oxidant is fed to the inlet compressor 118. The mass of oxidant exiting the inlet compressor 118 is largely determined by the density of the oxidant feed entering the inlet compressor 118. With a fixed inlet geometry, the inlet compressor 118 generally pulls in a fixed volume of gas. By controlling the temperature of the oxidant feed 120, its density can be controlled, which in turn means that at a constant volume the mass flow rate of the oxidant feed is also controlled. When the mass flow rate of the oxidant feed 120 to the combustion chamber 110 is constant, stoichiometric conditions can be maintained more easily. As shown in FIG. 5, the oxidant feed 120 is chilled in a heat exchanger 510 upstream of the inlet compressor 118. Cooling of the oxidant feed 120 is accomplished by a refrigerant, provided in stream 514. While a heat exchanger employing a refrigerant is depicted herein, any type of cooling device may be employed to cool the oxidant to the desired temperature. For example, other methods of cooling include one or more heat exchangers using chilled water or seawater as the cooling fluid, mechanical refrigeration units, direct contact coolers, trim coolers, and combinations thereof Additionally, any known refrigerant suitable for the intended use may be employed, such as for example non-halogenated hydrocarbons, fluorocarbons, hydrofluorocarbons, chlorofluorocarbons, hydrochlorofluorocarbons, anhydrous ammonia, propane, carbon dioxide, propylene, and the like. Further, although one heat exchanger 510 is depicted in FIG. 5, two or more heat exchangers or other cooling devices may be employed (not shown), particularly in conjunction with multi-stage compressors. In such embodiments, it may be desirable to incorporate one or more cooling devices between each stage of the compressor.

In one or more embodiments of the present invention, the chilled oxidant feed 120 exiting the heat exchanger 510 may optionally be directed to a separator 512 to remove any condensed water droplets that may be entrained therein. Separator 512 can be any device suitable for the removal of water droplets, such as for example a vane pack, mesh pad, or other demisting device. From the separator 512, the oxidant feed stream 120 is directed to the inlet compressor 118, and the remainder of the system 500 operates in the same fashion as the system 300 of FIG. 3 described previously. It will be apparent to those skilled in the art that one or more heat exchangers or other cooling devices may be used, with or without accompanying separators and regardless of the configuration of the exhaust gas recycle circuit or the location where a portion of the exhaust gas is added to the oxidant feed. Any such configurations or modifications are contemplated herein and considered to be within the scope of the invention.

While the present disclosure may be susceptible to various modifications and alternative forms, the exemplary embodiments discussed above have been shown only by way of example. Any features or configurations of any embodiment described herein may be combined with any other embodiment or with multiple other embodiments (to the extent feasible) and all such combinations are intended to be within the scope of the present invention. Additionally, it should be understood that the disclosure is not intended to be limited to the particular embodiments disclosed herein. Indeed, the present disclosure includes all alternatives, modifications, and equivalents falling within the true spirit and scope of the appended claims.

What is claimed is:

1. An integrated system comprising:
a gas turbine system comprising a combustion chamber configured to combust one or more oxidants and one or more fuels in the presence of a compressed recycle stream, wherein the combustion chamber directs a first discharge stream to an expander to generate a gaseous exhaust stream and at least partially drive a main compressor;
an inlet compressor configured to compress the one or more oxidants to generate a compressed oxidant stream and direct the compressed oxidant stream to the combustion chamber; and
an exhaust gas recirculation system, wherein the main compressor compresses the gaseous exhaust stream and thereby generates the compressed recycle stream;
wherein a variable portion of the gaseous exhaust stream is diverted from the exhaust gas recirculation system and combined with the one or more oxidants to form a combined oxidant-exhaust stream that is directed to the combustion chamber, wherein the combined oxidant-exhaust stream has an oxygen component suitable to achieve substantially stoichiometric reaction conditions with the one or more fuels in the combustion chamber; and
wherein the combustion chamber is configured to separately receive the combined oxidant-exhaust stream, the one or more fuels and the compressed recycle stream to create reaction conditions in the combustion chamber that are stoichiometric or substantially stoichiometric.

2. The integrated system of claim 1, wherein the variable portion of the gaseous exhaust stream diverted from the exhaust gas recirculation system is combined with the one or more oxidants upstream of the inlet compressor.

3. The integrated system of claim 1, wherein the variable portion of the gaseous exhaust stream diverted from the exhaust gas recirculation system is combined with the compressed oxidants stream downstream of the inlet compressor before the compressed oxidants stream enters the combustion chamber.

4. The integrated system of claim 1, wherein the variable portion of the gaseous exhaust stream diverted from the exhaust gas recirculation system is extracted from the main compressor and injected into the inlet compressor.

5. The integrated system of claim 4, wherein the main compressor comprises two or more stages and the gaseous exhaust stream is extracted from the main compressor between stages.

6. The integrated system of claim 4, wherein the inlet compressor comprises two or more stages and the gaseous exhaust stream is injected into the inlet compressor between stages.

7. The integrated system of claim 1, wherein the exhaust gas recirculation system comprises at least one cooling unit configured to receive and cool the gaseous exhaust stream and at least one blower configured to receive and increase the pressure of the gaseous exhaust stream before directing a cooled recycle gas to the main compressor.

8. The integrated system of claim 7, wherein the variable portion of the gaseous exhaust stream diverted from the exhaust gas recirculation system is diverted from the gaseous exhaust stream flowing from the at least one blower to the at least one cooling unit.

9. The integrated system of claim 1, further comprising one or more ratio controllers configured to adjust the flow of the combined oxidant-exhaust stream and the one or more fuels into the combustion chamber to maintain a fixed ratio of oxidant to fuel.

10. The integrated system of claim 1, further comprising one or more cooling devices configured to cool the one or more oxidants before introduction to the inlet compressor to generate a cooled oxidant.

11. The integrated system of claim 10, further comprising a separator configured to receive the cooled oxidant from the one or more cooling devices and remove water droplets from the cooled oxidant before introduction to the inlet compressor.

12. The integrated system of claim 10, wherein the one or more cooling devices is a heat exchanger using a refrigerant as a cooling fluid.

13. A method of generating power, comprising:
compressing one or more oxidants in an inlet compressor to form a compressed oxidant stream;
combusting the compressed oxidant stream and at least one fuel in a combustion chamber in the presence of a compressed recycle exhaust gas, thereby generating a discharge stream;
expanding the discharge stream in an expander to at least partially drive a main compressor and generate a gaseous exhaust stream;
directing the gaseous exhaust stream to an exhaust gas recirculation system, wherein the main compressor compresses the gaseous exhaust stream and thereby generates a compressed recycle stream; and
diverting a variable portion of the gaseous exhaust stream from the exhaust gas recirculation system and combining a diverted portion of the exhaust gas with the one or more oxidants to form a combined oxidant-exhaust stream that is directed to the combustion chamber, wherein the combustion chamber is configured to separately receive the combined oxidant-exhaust stream, one or more fuels and the compressed recycle stream to create reaction conditions in the combustion chamber that are stoichiometric or substantially stoichiometric.

14. The method of claim 13, wherein the variable portion of the gaseous exhaust stream diverted from the exhaust gas recirculation system is combined with the one or more oxidants upstream of the inlet compressor.

15. The method of claim 13, wherein the variable portion of the gaseous exhaust stream diverted from the exhaust gas recirculation system is combined with the compressed oxidants downstream of the inlet compressor before the compressed oxidants enter the combustion chamber.

16. The method of claim 13, wherein the variable portion of the gaseous exhaust stream diverted from the exhaust gas recirculation system is extracted from the main compressor and injected into the inlet compressor.

17. The method of claim 16, wherein the main compressor comprises two or more stages and the gaseous exhaust stream is extracted from the main compressor between stages.

18. The method of claim 16, wherein the inlet compressor comprises two or more stages and the gaseous exhaust stream is injected into the inlet compressor between stages.

19. The method of claim 13, wherein the exhaust gas recirculation system comprises at least one cooling unit and at least one blower, such that the gaseous exhaust stream is cooled in at the least one cooling unit and the pressure of the gaseous exhaust stream is increased in the at least one blower, thereby generating a cooled recycle gas directed to the main compressor.

20. The method of claim 19, wherein the variable portion of the gaseous exhaust stream diverted from the exhaust gas recirculation system is diverted from the gaseous exhaust stream flowing from the at least one blower to the at least one cooling unit.

21. The method of claim 13, further comprising adjusting the flow of the combined oxidant-exhaust stream and the one or more fuels into the combustion chamber to maintain a fixed ratio of oxidant to fuel.

22. The method of claim 21, wherein the flow of the oxidant-exhaust stream and the one or more fuels are adjusted by a ratio controller.

23. The method of claim 13, further comprising cooling the one or more oxidants before introduction to the inlet compressor to generate a cooled oxidant stream.

24. The method of claim 23, further comprising removing water droplets from the cooled oxidant stream before introduction to the inlet compressor.

25. The method of claim 23, wherein the one or more oxidants are cooled with a heat exchanger using a refrigerant as a cooling fluid.

* * * * *